United States Patent [19]
Nelson et al.

[11] Patent Number: 5,855,951
[45] Date of Patent: Jan. 5, 1999

[54] METHOD FOR MAKING CERAMIC SUBSTRATES FOR MAGNETIC-RECORDING MEDIA

[75] Inventors: Carl W. Nelson, Hayward; Richard D. Weir; Richard S. Weir, both of Agoura Hills, all of Calif.

[73] Assignee: Tulip Memory Systems, Inc., Fremont, Calif.

[21] Appl. No.: 844,447

[22] Filed: Apr. 18, 1997

Related U.S. Application Data

[62] Division of Ser. No. 184,844, Jan. 20, 1994, Pat. No. 5,681,635.
[51] Int. Cl.⁶ ..................................................... C23C 14/00
[52] U.S. Cl. .......................... 427/129; 427/131; 427/528; 427/530; 427/531; 204/192.16; 204/192.2; 204/192.31
[58] Field of Search ...................................... 427/129, 131, 427/530, 528, 531; 204/192.16, 192.2, 192.31

[56] References Cited

U.S. PATENT DOCUMENTS

| | | | |
|---|---|---|---|
| 4,828,905 | 5/1989 | Wada | 428/213 |
| 5,487,931 | 1/1996 | Annacone | 428/64.1 |
| 5,626,920 | 5/1997 | Weir et al. | 427/530 |

*Primary Examiner*—Stevan A. Resan
*Attorney, Agent, or Firm*—Limbach & Limbach L.L.P.

[57] ABSTRACT

An improved magnetic-recording disk and a process for manufacturing magnetic-recording disks are disclosed. An electrically conductive hard coating is deposited upon a ceramic substrate. This coating can be one from the group including the nitrides, carbides, and borides of titanium, zirconium, hafnium, vanadium, niobium, tantalum, chromium, molybdenum, or tungsten. Graded interfacial diffusion or pseudo-diffusion layers are formed between the ceramic substrate and the coating by the elemental metal present in the coating. Magnetic-recording media is then deposited upon the electrically conductive coating. Optionally, a texturable coating that is softer than the hard coating can be placed over the electrically conductive hard coating before the magnetic-recording media is deposited. This texturable coating limits the depth to which abrasive tape texturing can take place.

19 Claims, 1 Drawing Sheet

METHOD FOR MAKING CERAMIC SUBSTRATES FOR MAGNETIC-RECORDING MEDIA

This is a divisional of application Ser. No. 08/184,844, filed Jan. 20, 1994, now U.S. Pat. No. 5,681,635.

FIELD OF THE INVENTION

This invention relates generally to magnetic-recording disks, and relates more particularly to electrically insulating ceramic materials as substrates for application of an electrically conductive hard coating prior to the application of magnetic-recording media.

BACKGROUND OF THE INVENTION

In a disk file, the most common recording medium is a very flat and smooth aluminum-alloy substrate disk having both of its surfaces coated with a magnetic-recording material such as a ferrimagnetic or ferromagnetic oxide powder dispersed in a resin binder or a plated or sputter-deposited thin film of ferromagnetic cobalt alloy.

Typically, an aluminum-alloy substrate of a magnetic-recording disk has surfaces that are either diamond tool turned on a lathe or ground by a surface grinder. These machined surfaces result in matte finishes. Alternatively, substrate disks may be precision blanked from flat precision cold-rolled aluminum-alloy sheet or other metal strip whose surface finish would replicate that of the work rolls used in the finishing pass of the rolling mill. For example, with work rolls that have been ground and polished to a mirror-bright finish, a metal strip with a mirror-bright surface finish would result.

Aluminum is a soft metal and, therefore, can be damaged by a read/write head impacting the disk too forcefully. To provide for protection against defects caused by impacts of a read/write head, an aluminum-alloy substrate is typically first coated with a hard, nonmagnetic material before the magnetic-recording material is applied. A nickel-phosphorus alloy, electroless-deposited from an aqueous solution, is the hard material commonly used for this application. In order for this protective plating to adhere properly to the surface of an aluminum-alloy substrate, a zincate solution is used to dissolve the surface aluminum oxides, hydroxyoxides, and hydrous oxides, and to provide a zinc metal layer by replacement reaction. After coating, the surface of the nickel-phosphorus-alloy-coated disk is lapped and polished to provide a flat and smooth surface for the application of the magnetic layer.

Apart from the need to lap and polish the disk after application of the nickel-phosphorus alloy, the application of this hard coating presents additional difficulties. For example, it is extremely difficult to obtain flaw-free electroless-deposited nickel-phosphorus-alloy coatings. Nodules, pits, and bumps occur in these coatings and such defects cause recording errors.

Another problem is that the electroless-deposited nickel-phosphorus alloy is very prone to recrystallization upon heating, where the nonmagnetic (actually, superparamagnetic) single phase of nickel and phosphorus, separates into two equilibrium crystalline phases, namely, nickel, which is ferromagnetic, and nickel phosphide. The resulting ferromagnetism renders the media useless for the magnetic-recording application.

Moreover, such a disk is also subject to warpage upon heating because of stress concentrations at the coating-substrate interface. This warpage also renders the media useless.

Another problem associated with the use of an aluminum alloy as a substrate includes the added cost for time and labor involved in its processing. Furthermore, entire disks can be rendered useless through a myriad of heat-related effects.

SUMMARY OF THE INVENTION

The present invention overcomes the problems in the prior art by providing an improved magnetic-recording disk having a ceramic substrate and a method for its manufacture. The purpose of the present invention is to provide a cost-effective, electrically insulating, ceramic substrate having a coating that is strongly adhesive, electrically conductive, sufficiently thick, and at least as hard as the ceramic substrate itself.

The materials meeting the criteria of having simultaneously greater hardness than that of any silicate or oxide ceramic body and sufficiently high electrical conductivities are found in the group consisting of the nitrides, carbides, and borides of titanium, zirconium, hafnium, vanadium, niobium, tantalum, chromium, molybdenum, or tungsten. An evaporative-ion-plating system is employed to coat the ceramic substrates with materials from the above-mentioned group. A texturable thin layer of reduced-hardness material may be deposited upon this coating to limit the abrasive tape texturing of the disk substrate surface.

Once the substrates have been prepared with the desired coatings, they can be subjected to bias sputtering in the same way as metal substrates to provide a magnetic-recording material overlying the previous coatings.

Figure 1:
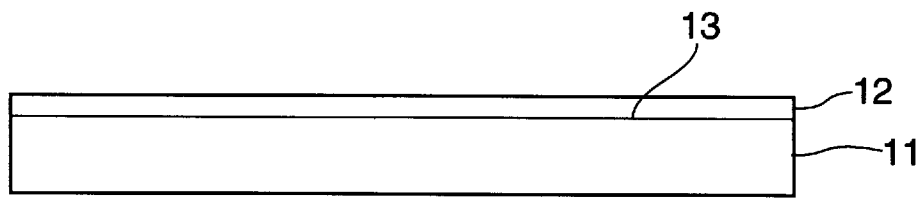
FIG. 1 is a side view of a ceramic substrate of the present invention with a hard coating.
Figure 2:
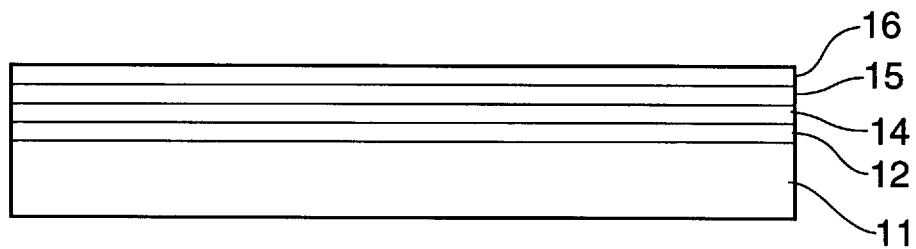
FIG. 2 is a side view of the ceramic substrate of FIG. 1 with a layer of magnetic-recording media and a texturable layer of reduced hardness applied directly upon the coating.

Note that the dimensions of the various layers and coatings illustrated in FIGS. 1 and 2 are not drawn to scale. Also note that the layers and coatings are illustrated in FIGS. 1 and 2 to be on only one side of the substrate, but in actual practice the layers and coatings would most likely be applied to both sides of the substrate.

DETAILED DESCRIPTION OF THE PREFERRED EMBODIMENTS

In accordance with the illustrated preferred embodiment of FIG. 1, the present invention provides an improved magnetic-recording disk having a ceramic substrate and a process for manufacturing magnetic-recording disks. The disk substrate 11 is comprised of a ceramic material which is suitably formed and fired to shape, dimensioned to size by grinding, and surface finished by lapping and polishing. All ceramic materials are included in the scope of this invention.

The term ceramics in the broadest sense includes the noncrystalline silicate, aluminosilicate, borosilicate, and boroaluminosilicate glasses as well as polycrystalline silicate, aluminosilicate, and oxide materials. Ceramic bodies, implied by the more restricted usage of the term, consist of crystalline particles bonded together either with a glass (vitreous) matrix or from the fusion of the particles at their grain boundaries. The vitreous matrix is produced by chemical reaction between the small amounts of glass network-forming and network-modifying oxides included in the raw materials and the major crystalline constituent or constituents. All components of the ceramic body are originally in the form of oxide powders or for some glass network-modifying oxides in the form of carbonate powders. For the case of high-purity oxide ceramic bodies, particle sintering is frequently aided by the addition of a very small amount of a second oxide powder, where the two oxides form a eutectic-melting or lower-temperature-melting combination than that of either component. With appropriate selection of the second oxide, it is also possible to inhibit grain growth during firing and to produce pore-free ceramic bodies with markedly improved surfaces.

The term glass ceramics, another type of ceramics, applies to those materials that are melted and fabricated as true glasses, and then converted to the partly crystalline state. To be converted, a glass must contain a nucleating agent that will precipitate as crystallites with heat treatment. These crystallites form nuclei around which larger crystals can grow. Heat treatment at a temperature higher than the nucleating temperature then causes crystals to grow. The resulting materials are mechanically stronger, tougher, and harder than the parent glass, nonporous, and finer-grained than conventional polycrystalline surfaces.

The term ceramics has been further broadened to include the refractory nitrides, carbides, and borides when prepared from powders to produce polycrystalline bodies by the customary forming and sintering techniques. As above, the crystalline particles can be bonded together with a glass matrix consisting usually of silica glass, aluminosilicate glass, or for the case of the borides, borosilicate glass. Alternatively, silicon can be used for bonding the particles together, as in silicon nitride ($Si_3N_4$), silicon carbide (SiC), and boron carbide ($B_4C$), so that the intergranular matrix is polycrystalline instead of glassy. When silicon is used in particle bonding with the metallic nitrides, carbides, and borides, the respective metal silicide phase is formed in the intergranular region as well. Materials with the highest strength require fusion of the particles at their grain boundaries, necessitating the use of sintering aids, and for a pore-free product, the use of pressure sintering. Hot pressing combines uniaxial pressure and sintering in one step. In hot isostatic pressing, isostatic pressure and sintering are combined wherein a high-pressure high-temperature inert gas is the pressing medium.

A key disadvantage in the use of ceramic materials as substrates for the magnetic-recording-disk application is the electrically insulating nature of these materials. In the fabrication of magnetic-recording media, the most common technique for depositing the various thin-film layers is magnetron diode sputtering in systems wherein the disk substrates are coated simultaneously on both sides. Typically, in these coating systems, the disk substrate is held vertically on its outside diameter at its lower portion by one curved vee-block whose radius of curvature is the same as that of the disk, or by three straight vee-blocks mounted so as to retain the disk. With this arrangement, electrically conducting (i.e., metal or semiconductor) substrates are required for effective substrate bias sputtering. On the other hand, electrically insulating substrates, whether the substrate holder is powered by dc or high-radiofrequency (13.56 MHz rf) methods, cannot be bias sputtered because of the immediate positive-charge buildup on the surfaces, which then prevents any further ion bombardment. However, this positive-charge surface buildup can be overcome in the rf-powered case (but not in the dc-powered case) if the electrically insulating substrate's disk side is placed against a metal backing plate in contact with the substrate holder, but then the advantage of simultaneously coating both disk sides is sacrificed.

In principle, once an electrically insulating substrate in the sputtering system becomes coated with a metallic or electrically conductive thin film, and provided that this thin film is in contact with the powered substrate holder, then substrate bias sputtering is possible. However, this approach has been shown to be impractical. At the contact points, due to the very limited contact area provided by the above-described substrate-holding arrangement, and to the magnitude of the current carried, together with the condition of an insufficient metal film thickness, the thin film becomes overheated and even evaporates away.

Substrate bias sputtering is a convenient and powerful technique for controlling film morphology. For the case of ferromagnetic films and their epitaxially growth-determining underlayers, substrate bias sputtering has been shown to have a significant and highly desirable effect on the film structure and magnetic characteristics.

Currently, manufacturers of magnetic-recording media, when using electrically insulating ceramic disk substrates in the above-described sputtering systems, have to forego the advantages of substrate bias sputtering. If there were a cost-effective means of providing electrically insulating ceramic substrates with a strongly adhesive, electrically conductive, and sufficiently thick coating of equivalent or greater hardness and toughness than that of the substrate, then such substrates could be bias sputtered in the same way as metal substrates in these sputtering systems, without any sacrifice of the desirable physical properties and mechanical characteristics of the ceramic body. The present invention, as embodied in FIG. 1, relates particularly to such coatings on and the processes for applying these coatings 12 to substrates such as substrate 11.

Materials meeting the criteria, for coating 12, of having simultaneously greater hardness than that of any silicate or oxide ceramic body and sufficiently high electrical conductivities are found in the group consisting of the nitrides, carbides, and borides of titanium, zirconium, hafnium, vanadium, niobium, tantalum, chromium, molybdenum, or tungsten. Interestingly, the nitrides and borides of titanium, zirconium, hafnium, and vanadium have higher electrical conductivities than the respective pure metals. As such, these compounds are the only exceptions known to the general rule. These materials as hard coatings on metal disk substrates and the methods of application thereof, namely, evaporative reactive ion plating and reactive sputtering, have been disclosed in U.S. patent application Ser. No. 07/771,348, filed Oct. 4, 1991, by two of the instant inventors, which disclosure is hereby incorporated by reference. The same evaporative-ion-plating system described in this prior patent application can be employed for the purpose of coating electrically insulating ceramic disk substrates with the same electrically conductive hard materials.

Another important feature of this invention is that a graded interfacial diffusion or pseudo-diffusion region 13 is formed by the elemental metal (namely, Ti, Zr, Hf, V, Nb, Ta, Cr, Mo, or W) between the ceramic substrate 11 and the respective metal-compound coating 12 (namely, the nitrides, carbides, or borides of the aforementioned metals). All these elements are strong oxide formers. The graded interfacial region 13 provides a gradual change in composition and stress across the layer, first, into the surface region of the ceramic substrate 11, and second, a concentration gradient of the respective metal into the compound coating 12. By such means, the adhesion, toughness, and durability of the coating 12 are enhanced.

Yet another important feature of this invention is the surface-compression prestress of the ceramic substrate 11 provided by the energetic-atom-deposited hard coating 12. Ceramics are typically hard and brittle, and as such are much stronger in compression than in tension. The compressive internal stress characteristic of the energetic-atom-deposited hard coating 12 on the ceramic substrate 11 thereby serves to substantially strengthen this substrate against fracture and breakage. The development of compressive strength at the surface results in an increase in the flexural strength of the body.

Surface finishes of as-fired ceramic bodies, depending on material selection, vary in roughness over a very wide range. The best surface smoothness on an atomic scale is obtained by a soda-lime silicate glass formed as flat sheet by the float process on molten tin (originated by Pilkington Glass). Glass produced as flat sheet by the overflow process, in which two streams from opposite sides of a narrow triangular trough flow downward and meet at the apex below, results in a surface quality almost equal to that of the float process and is suitable to a much greater variety of glass compositions (originated by Corning Glass). Glass formed as flat sheet by either the rolling or drawing processes has surface irregularities (i.e., ripples, lines, and asperities) stemming from being touched by the forming tool, unlike the above two cases (older processes originated by PPG Glass and LOF Glass, respectively). Such sheet glass when ground and polished to obtain a high-quality surface finish is known as plate glass. However, the abrasive action of these operations perturbs the glass surface and the resulting smoothness is not as fine on an atomic scale as that obtained on the untouched glass produced by the float and overflow processes.

The surface finish of glass ceramics depends on the glass-forming process and the microstructure of the body, the latter in turn determined by the chemical composition, the crystallization treatment, the crystalline fractional volume amount, and the glassy and crystalline phase assemblage. Since crystalline development is dependent on internal nucleation and growth in the glass, a wide variety of microstructures can be produced in glass ceramics. These microstructures are very different from those of conventional polycrystalline ceramics. Depending on the chemical composition and the crystallization treatment of the glass ceramics, a wide range of crystallite shapes and sizes can be obtained. In an ultrafine-grained body, the crystallite size is 50 to 100 nm (500 to 1000 Å). Because of the exceedingly small crystallite size, such materials are transparent when the conditions of a sufficiently small birefringence of the crystalline phase and a sufficiently small difference in refractive index between the crystalline and glass phases are both met. The opposite of these conditions results in materials with high opacity very-fine-grained bodies have a crystallite size of 1.0 to 2.0 $\mu$m, and fine-grained bodies a crystallite size of 2.0 to 5.0 $\mu$m. Since the hardness difference between the glass and crystalline phases in glass ceramics is not large, the differential surface erosion during the lapping and polishing operations is small, and thus very fine surface textures can result. In fact, the ultrafine-grained transparent glass ceramics are optically polishable in the same way as ordinary glasses.

Compared with the glasses and glass ceramics, polycrystalline ceramic materials offer higher softening temperatures, greater mechanical strength and hardness, and better thermal conductivity, but have the disadvantage of rougher surfaces. In general, the smaller and the more uniform the grain size, and the lower the fractional volume amount of the glass matrix phase, the smoother is the as-fired ceramic surface. For example, in a 96 percent alumina ceramic with a density of 3.80 g/cm$^3$, some of the aluminum oxide becomes part of the glass phase with the result that the glass matrix occupies about 11.5 volume percent of the body. The aluminum oxide crystalline phase is very much harder than the calcium magnesium aluminosilicate glass phase, the Vickers microhardnesses being about 2200 and 550 kg/mm$^2$, respectively. Grinding and lapping such a body will produce the required dimensional and flatness tolerances, respectively, but lapping and polishing to obtain very fine surface finishes has limits because of the differential erosion which occurs with the abrasive action. In addition, crystallite pullout from the glass matrix also occurs leaving voids at the surface. To overcome these limitations, 99.5 and higher percent alumina ceramics with very fine and uniform grains have been developed which produce an as-fired surface roughness of 2.0 to 4.0 microinches $R_A$ (CLA). With lapping and polishing, this surface roughness can be reduced to less than 1.0 microinch $R_A$ (CLA).

In the above-referenced prior patent application, the surface finish of ion-plated and substrate-bias-sputtered coatings is discussed. Three cases are described pertaining to the Zone 1/Zone T area of the Movchan-Demchishin-Thornton zone-structure diagram. The first case shows that where the energy involved per depositing atom is sufficiently low, a coating characteristic of the thermalized-atom-deposited porous columnar Zone 1 structure is obtained. Here, as the thickness of the coating increases, the surface roughness increases with the result that the coating peaks are higher and the coating valleys are deeper than those of the substrate surface.

The second case shows that where the energy involved per depositing atom is sufficiently high, a coating characteristic of the energetic-atom-deposited dense fibrous Zone T structure is obtained. Here the coating is completely conformal where the substrate surface is accurately replicated.

The third case shows that where the energy involved per depositing atom is still higher, this coating, too, is characteristic of the energetic-atom-deposited dense fibrous Zone T structure, but a levelized coating is obtained. The energetic atom and/or ion bombardment is sufficiently high to erode what-would-have-been surface roughness peaks and to redistribute the film material into the valleys. In fact, it has been shown that on substrates having matte surfaces with a roughness of 12 to 16 microinches $R_A$ (CLA), such coatings deposited to a 3.0 to 4.0 $\mu$m thickness produce mirror bright surfaces with a roughness of less than 1.0 microinch $R_A$ (CLA).

Since coatings characteristic of the thermalized-atom-deposited porous columnar Zone 1 structure form with a tensile internal stress, they have not only the structural disadvantages of low adhesive strength because of the abrupt coating-substrate interfacial boundary and of low cohesive (tensile) strength because of the open grain boundaries but also would not serve to strengthen the ceramic substrate. On the other hand, coatings characteristic of the energetic-atom-deposited dense fibrous Zone T structure form with a compressive internal stress and are characterized by having strong adhesion caused by the graded "pseudo-diffusion" interface resulting from the embedment of the bias-sputtered atoms into the substrate and by having very high cohesive (tensile) strength, and thereby serve to provide the surface-compression prestress necessary to substantially strengthen the ceramic substrate. For this reason, the hard coating of the present invention is characterized by the energetic-atom-deposited dense fibrous Zone T structure. References on the subject of coating zone structures include the following: J. A. Thornton, J. Vac. Sci. Technol. 11, 666 (1974); D. W. Hoffman and R. C. McCune in "Handbook of Plasma Processing Technology", S. M. Rossnagel, J. J. Cuomo, and W. D. Westwood, eds., Ch. 21, pp. 483–517, Noyes Publications, Park Ridge, N.J. (1990).

A further object of this invention is to provide hard coatings, of sufficient thickness and deposited under sufficiently high energetic conditions, onto ceramic substrates with less-than-optimal surface finishes so that the final surface finish is mirror bright.

Another embodiment of the present invention, as shown in FIG. 2, provides a texturable thin layer 14 of reduced hardness, also deposited under sufficiently high energetic conditions, over the above-described thicker hard coating 12 on ceramic substrates 11. For the case of a titanium nitride hard coating 12 on a ceramic substrate 11 as an example of the aforementioned hard materials, after depositing the coating 12 to a 0.5 to 5.0 $\mu$m thickness and with a Vickers microhardness of 2500 to 3000 kg/mm$^2$, an overlayer 14 of a titanium-nitrogen solid-solution alloy with a nitrogen content selected to give a Vickers microhardness of about 800 kg/mm$^2$ is deposited to a 100 to 150 nm thickness. This reduction in microhardness during the last phase of the deposition is easily accomplished by reducing the quantity (i.e., the gas throughput and also known as the flowrate) of nitrogen gas to the appropriate level during this period. Abrasive texturing of the disk substrate surface is then limited in depth to the thickness of the reduced-hardness overlayer 14 because the underlying hard coating 12 acts as a stop. Consequently, the texture grooves are of uniform depth over the entire disk area. A circumferential scratch pattern, produced by holding the rotating disk against the abrasive tape or against the tape with a slurry between, fulfills simultaneously two desirable purposes: 1) tribologically, minimizing stiction and friction at the head-to-disk interface; and 2) on the subsequently sputter-deposited films of a chromium (or chromium-alloy) underlayer 15 and a cobalt-alloy magnetic layer 16, providing a preferred orientation of the crystallites along the circumferential texture lines in the substrate plane. An in-plane circumferential versus radial anisotropy results, improving the read-signal parametrics of cobalt-chromium and cobalt-chromium-tantalum alloy magnetic-recording films. Very likely there are many more not-yet-investigated cobalt alloys which would exhibit the same or similar effect. Prior to the present invention, manufacturers of magnetic-recording media, when using ceramic disk substrates in the aforementioned sputtering systems, have had to forego the advantages inherent in the selection of in-plane magnetically anisotropic cobalt-alloy films because of the difficulty of providing these substrates with a circumferential texture pattern. The present invention overcomes this disadvantage by providing the texturable layer 14.

The improved magnetic-recording disk of the present invention will now be compared to conventional magnetic-recording disks. The 5086 aluminum-magnesium alloy (UNS A95086) is very widely used for disk substrates by the magnetic-recording industry. Several variants of this alloy are available at higher cost where an attempt is made to minimize the presence of intermetallic compounds and of inclusions of nonmetallic silicates and metal silicides. Since the hardnesses of these compounds and inclusions are greater than that of the solid-solution-strengthened aluminum alloy, difficulties in surface finishing are caused by their presence. Furthermore, intermetallic compounds at the surface manifest themselves as nodules or pits in the overlying electroless-deposited nickel-phosphorus-alloy coating. Inclusions at the surface cause holes in the coating. The composition of the electroless-deposited nickel-phosphorus alloy contains at least 8.0 weight percent (14.15 atom percent) phosphorus in order to minimize on heating the development of ferromagnetism. Higher-phosphorus-content Ni—P alloys are more resistant to recrystallization and therefore to becoming ferromagnetic, but the hardness decreases after reaching a maximum at 8.0 weight percent.

The following comparison chart, TABLE 1, shows some physical and mechanical properties of the 5086 aluminum alloy (UNS A95086), the electroless-deposited nickel-phosphorus alloy with 8.0 weight percent phosphorus content, and several commercially available ceramic materials for use as the disk substrate 11. The data for the ceramic materials tabulated in this comparison chart has been collected from manufacturers' literature.

TABLE 1

COMPARISON CHART

| | | Conventional Substrate | | Ceramic Material and Manufacturer's Designation | | |
| --- | --- | --- | --- | --- | --- | --- |
| | | | | Hoya chemically | Pilkington | |
| | | Aluminum-magnesium-alloy core | Electroless nickel-phosphorus-alloy coating | strengthed aluminosilicate glass | chemically strengthed soda-lime silicate glass | Corning canasite glass ceramic |
| | | | Material nomenclature | | | |
| Material properties | Units | 5086 | Ni-8P | N5 | Float | MemCor 9634 |
| Density | g/cm$^3$ | 2.66 | 8.31 | 2.52 | 2.50 | 2.70 |
| Elasticity modulus | GPa | 71 | 70 | 83.5 | 73 | 82.7 |
| Stiffness/density | GPa/g/cm$^3$ | 26.7 | 8.4 | 33.1 | 29.2 | 30.6 |
| Flexural strength | MPa | | | 590 | 460 | 300 |
| Flexural strength/density | MPa/g/m$^3$ | | | 234 | 184 | 111 |
| Rupture tensile strength | MPa | | 750 | | | 207 |
| Fracture toughness | MPa m$^{0.5}$ | | | | | 4.0 |
| Knoop microhardness | kg/mm$^2$ | 70 | 450–550 | 670 | 600 | 600–650 |
| Vickers microhardness | kg/mm$^2$ | | | | | |
| Melting point range | °C. | 585–640 | 890 | | | |
| Strain point | °C. | | | 690 | 510 | 500 |
| Thermal-expansion coefficient | | | | | | |

TABLE 1-continued

COMPARISON CHART

| | | | | | | |
|---|---|---|---|---|---|---|
| 20° to 100° C. | $10^{-6}$ cm/cm °C. | 23.8 | 14.0 | 9.1 | 7.8 | 12.5 |
| 25° to 300° C. | $10^{-6}$ cm/cm °C. | | | | | |
| 25° to 600° C. | $10^{-6}$ cm/cm °C. | | | | | |
| 25° to 1000° C. | $10^{-6}$ cm/cm °C. | | | | | |
| Thermal conductivity (25° C.) | W/m/°C. | 125 | 4.4 | 1.28 | | 1.28 |
| Volume heat capacity (25° C.) | cat/cm³/°C. | 0.580 | | 0.501 | | |
| Ultimate tensile strength (25° C.) | | | | | | |
| annealed | MPa | 262 | | | | |
| 20% work hardened | MPa | 290 | | | | |
| 40% work hardened | MPa | 324 | | | | |
| Yield strength 0.2% (25° C.) | | | | | | |
| annealed | MPa | 117 | | | | |
| 20% work hardened | MPa | 207 | | | | |
| 40% work hardened | MPa | 255 | | | | |
| Anneated Condition | | | | | | |
| Temperature (260° C.) | | | | | | |
| Ultimate tensile strength | MPa | 117 | | | | |
| Yield strength 0.2% | MPa | 76 | | | | |
| Temperature (316° C.) | | | | | | |
| Ultimate tensile strength | MPa | 76 | | | | |
| Yield strength 0.2% | MPa | 52 | | | | |

| | | Ceramic Material and Manufacturer's Designation | | | | |
|---|---|---|---|---|---|---|
| | | Kyocera glazed 96% alumina ceramic | | Kyocera 99.6% alumina ceramic | Coors 99.6% alumina ceramic | Coors 99.9% alumina ceramic | Coors zirconia-toughened alumina ceramic |
| | | | | | Material nomenclature | | |
| | | CeraDisk | | Masterstrate | Superstrate | | |
| Material Properties | Units | A-476 | Glaze | A-494 | ADS-996 | AD-99.9 | ZTA |
| Density | g/cm³ | 3.80 | 2.50 | 3.90 | 3.90 | 3.96 | 4.08 |
| Elasticity modulus | GPa | 314 | | 372 | 372 | 386 | 3.61 |
| Stiffness/density | GPa/g/cm³ | 82.6 | | 95.4 | 95.4 | 97.5 | 88.5 |
| Flexural strength | MPa | 275 | | 552 | 620.5 | 552 | 414 |
| Flexural strength/density | MPa/g/m³ | 72.4 | | 141.5 | 59.1 | 139.4 | 101.5 |
| Rupture tensile strength | MPa | | | | | 3.10 | 221 |
| Fracture toughness | MPa m$^{0.5}$ | | | | | 5.0 | 5.5 |
| Knoop microhardness | kg/mm² | | | | 1500 | 1550 | 1475 |
| Vickers microhardness | kg/mm² | 1500 | 580 | 1700 | | | |
| Melting point range | °C. | | | | | | |
| Strain point | °C. | 1600 | 650 | 1700 | | 1900 | |
| Thermal-expansion coefficient | | | | | | | |
| 20° to 100° C. | $10^{-6}$ cm/cm °C. | | | | | | |
| 25° to 300° C. | $10^{-6}$ cm/cm °C. | 7.1 | 7.0 | 7.2 | 7.0 | | |
| 25° to 600° C. | $10^{-6}$ cm/cm °C. | 7.4 | | 7.4 | 7.5 | | |
| 25° to 1000° C. | $10^{-6}$ cm/cm °C. | | | | 8.3 | 8.4 | 8.2 |
| Thermal conductivity (25° C.) | W/m/°C. | 20.9 | 1.3 | 33.5 | 35.0 | 38.9 | |
| Volume heat capacity (25° C.) | cat/cm³/°C. | 0.722 | | 0.741 | | 0.832 | |
| Ultimate tensile strength (25° C.) | | | | | | | |
| annealed | MPa | | | | | | |
| 20% work hardened | MPa | | | | | | |
| 40% work hardened | MPa | | | | | | |
| Yield strength 0.2% (25° C.) | | | | | | | |
| annealed | MPa | | | | | | |
| 20% work hardened | MPa | | | | | | |
| 40% work hardened | MPa | | | | | | |
| Anneated Condition | | | | | | | |
| Temperature (260° C.) | | | | | | | |
| Ultimate tensile strength | MPa | | | | | | |
| Yield strength 0.2% | MPa | | | | | | |
| Temperature (316° C.) | | | | | | | |

TABLE 1-continued

COMPARISON CHART

| | | Ceramic Material and Manufacturer's Designation | | | | |
|---|---|---|---|---|---|---|
| | | Corrs transformation-toughened yttria-zirconia ceramic | Diamonite zirconia-toughened alumina ceramic | Cookson $Si_3N_4$—$Al_2O_3$—$AlN$ solid-solution ceramic | Cercom pressureless-sintered silicon nitride ceramic | Cercom pressure-sintered silicon nitride ceramic |
| | | | | Material nomenclature | | |
| Material Properties | Units | Y-TZP | 200 | Syalon 101 | "PSG" $Si_3N_4$ | "PAD" $Si_3N_4$ |
| Density | g/cm³ | 6.02 | 4.28 | 3.25 | 3.26 | 3.30 |
| Elasticity modulus | GPa | 200 | 278 | 290 | 303 | 310 |
| Stiffness/density | GPa/g/cm³ | 33.2 | 65.0 | 89.2 | 92.9 | 93.9 |
| Flexural strength | MPa | 900 | 757 | 945 | 689 | 828 |
| Flexural strength/density | MPa/g/m³ | 149.5 | 176.9 | 290.8 | 211.3 | 250.9 |
| Rupture tensile strength | MPa | | 481 | 448 | | |
| Fracture toughness | MPa m$^{0.5}$ | 13.0 | 6.5 | 7.7 | 5.7 | 6.1 |
| Knoop microhardness | kg/mm² | 1300 | 1380 | 1600 | 1450 | 1580 |
| Vickers microhardness | kg/mm² | | 1575 | 1850 | 1650 | 1800 |
| Melting point range | °C. | | | | | |
| Strain point | °C. | 2400 | | | | |
| Thermal-expansion coefficient | | | | | | |
| 20° to 100° C. | 10$^{-6}$ cm/cm °C. | | | | | |
| 25° to 300° C. | 10$^{-6}$ cm/cm °C. | | 7.8 | | | |
| 25° to 600° C. | 10$^{-6}$ cm/cm °C. | | 8.5 | | | |
| 25° to 1000° C. | 10$^{-6}$ cm/cm °C. | 10.3 | 9.1 | 3.0 | 3.3 | 3.3 |
| Thermal conductivity (25° C.) | W/m/°C. | 2.2 | 15.8 | 21.3 | 29.5 | 30.0 |
| Volume heat capacity (25° C.) | cat/cm³/°C. | | | | 0.420 | 0.426 |
| Ultimate tensile strength (25° C.) | | | | | | |
| annealed | MPa | | | | | |
| 20% work hardened | MPa | | | | | |
| 40% work hardened | MPa | | | | | |
| Yield strength 0.2% (25° C.) | | | | | | |
| annealed | MPa | | | | | |
| 20% work hardened | MPa | | | | | |
| 40% work hardened | MPa | | | | | |
| Anneated Condition | | | | | | |
| Temperature (260° C.) | | | | | | |
| Ultimate tensile strength | MPa | | | | | |
| Yield strength 0.2% | MPa | | | | | |
| Temperature (316° C.) | | | | | | |
| Ultimate tensile strength | MPa | | | | | |
| Yield strength 0.2% | MPa | | | | | |

| | | Ceramic Material and Manufacturer's Designation | | |
|---|---|---|---|---|
| | | Cercom pressure-sintered aluminum nitride ceramic | Cercom pressure-sintered silicon carbide ceramic | Cercom pressure-sintered boron carbide ceramic |
| | | Material nomenctature | | |
| Material Properties | Units | "PAD" AlN | "PAD" SiC | "PAD" $B_4C$ |
| Density | g/cm³ | 3.27 | 3.20 | 2.48 |
| Elasticity modulus | GPa | 330 | 455 | 455 |
| Stiffness/density | GPa/g/cm³ | 100.9 | 142.2 | 183.5 |
| Flexural strength | MPa | 358 | 655 | 366 |
| Flexural strength/density | MPa/g/m³ | 109.5 | 204.7 | 147.6 |
| Rupture tensile strength | MPa | | | |
| Fracture toughness | MPa m$^{0.5}$ | 2.5 | 5.2 | 4.0 |
| Knoop microhardness | kg/mm² | 1100 | 2700 | 3000 |
| Vickers microhardness | kg/mm² | | 3100 | 3800 |
| Melting point range | °C. | | | |
| Strain point | °C. | | 2000 | 2000 |
| Thermal-expansion coefficient | | | | |

TABLE 1-continued

COMPARISON CHART

| | | | | |
|---|---|---|---|---|
| 20° to 100° C. | 10⁻⁶ cm/cm °C. | | | |
| 25° to 300° C. | 10⁻⁶ cm/cm °C. | | | |
| 25° to 600° C. | 10⁻⁶ cm/cm °C. | | 4.1 | 4.5 |
| 25° to 1000° C. | 10⁻⁶ cm/cm °C. | 5.0 | 4.5 | |
| Thermal conductivity (25° C.) | W/m/°C. | 100 | 155 | 40.0 |
| Volume heat capacity (25° C.) | cat/cm³/°C. | | 0.459 | 0.592 |
| Ultimate tensile strength (25° C.) | | | | |
| annealed | MPa | | | |
| 20% work hardened | MPa | | | |
| 40% work hardened | MPa | | | |
| Yield strength 0.2% (25° C.) | | | | |
| annealed | MPa | | | |
| 20% work hardened | MPa | | | |
| 40% work hardened | MPa | | | |
| Anneated Condition | | | | |
| Temperature (260° C.) | | | | |
| Ultimate tensile strength | MPa | | | |
| Yield strength 0.2% | MPa | | | |
| Temperature (316° C.) | | | | |
| Ultimate tensile strength | MPa | | | |
| Yield strength 0.2% | MPa | | | |

The evaporative-ion-plating system described in the aforementioned prior patent application will now be discussed in detail. This system is employed in the present invention for the purpose of coating electrically insulating ceramic disk substrates with an electrically conductive hard material. This system contains an electrically isolated cantilevered drum planetary substrate holder in which six equispaced planet gears, each with its cantilevered shaft, rotate around a nonrotating sun gear, causing the drum housing to also rotate around the sun gear. In addition, this assembly reciprocates along its support shaft which extends through an electrical insulator mounted on the chamber center backwall to the outside. The simultaneous rotating and reciprocating motions provide the necessary mechanical averaging to obtain coatings of very uniform thickness and microstructure. The disk substrates through the inside diameter are mounted in deep circumferential vee-grooves of the round cantilevered shafts so that they are equispaced along each shaft length. As the shaft rotates, the disk substrates also rotate in the same direction, with the result that the entire disk inside diameter surface is uniformly coated, which is an attractive feature.

Connected to the support shaft of the cantilevered drum planetary substrate holder at its outside end are high-radiofrequency (13.56 MHz rf) and rf-filtered dc power sources; the 13.56 MHz rf power source is comprised of an impedance-matching network and a generator. At the chamber center topwall is located the high-radiofrequency-powered magnetic- field-enhanced hollow-cathode plasma device for support of gas discharges disclosed in U.S. patent application Ser. No. 08/098,417, filed Jul. 27, 1993, by two of the instant inventors, which disclosure is hereby incorporated by reference. Triode assistance in the form of thermionic hot-tungsten-filament cathodes is provided in the chamber along each side, but near the two lower quadrants of the cantilevered drum planetary substrate holder. The two filaments are powered by an rf-filtered 50 or 60 Hz ac source and are negatively biased with respect to ground by an rf-filtered dc power source. Electron emission is controlled by adjusting the temperature of the filament with more electrons being emitted by increasing the ac heating current through the filament. Located outside on each side are magnetic field coils to provide magnetic enhancement of the gas discharge by the magnetic-bottle effect. The magnetic field strength is directly proportional to the current through the coils provided by a dc power source. The high-voltage low-current 270° magnetic-field-deflected electron-beam evaporation source, from whose water-cooled hearth the metal is evaporated, is located in a well at the chamber bottom centered under the six-shaft section of the drum planetary substrate holder.

Each of the above-described powered elements contributes to increasing the plasma density in the chamber. By operating the electrically isolated cantilevered drum planetary substrate holder in the unpowered mode and the other elements in the powered mode, the substrate holder and the disk substrates mounted on it reach a floating potential (with respect to ground) where the bombarding-ion current plus any secondary-electron-emission current equals the incoming electron current so that there is no net current. The bombarding-ion energy essentially equals the difference between the plasma potential and the floating potential.

Under these conditions the plasma density is sufficiently high that conformal coatings characteristic of the energetic-atom-deposited dense fibrous Zone T structure are obtained. As the disk substrates rotate in the vee-grooves of the rotating round mandrels, contact for each disk substrate with the mandrel is essentially a single-point one which moves with the rotation. Simultaneous coating of both sides, the outside-diameter surface, and the entire inside-diameter surface of the disk substrates takes place.

After a coating of an electrically conductive hard material has been deposited to a sufficient thickness on the electrically insulating disk substrates, then the high-radiofrequency power source connected to the drum planetary can be turned on and ramped up slowly as the deposition continues. Since there are no discontinuities in the coating at the disk-inside-diameter surface and even though the contact between the rotating mandrel and the rotating disk is a single-point one, arcing and damage do not appear. Therefore, this design provides effective rf biasing of the disk substrates. Furthermore, the deep mandrel vee-grooves provide sufficient area for effective capacitive coupling of the rf power to the disk substrates.

The reciprocating motion of the cantilevered drum planetary substrate holder causes the developed dc bias voltage (measured with respect to ground) that results from the applied rf power to vary with location. The magnitude of this negative dc bias voltage, of course, increases with rf power. The relationship of power and voltage is not the same as that in the well-known single high-radiofrequency-powered planar-disk-diode configuration in which power is proportional to $V^{2.5}$. In the present invention, the voltage exponent is in the range of 5 to 8 increasing with power because of the multi-quasi-hollow-cathode configuration formed by the pairs of facing disk substrate sides. With the use of the rf-filtered dc power source connected to the cantilevered drum planetary substrate holder, for a given applied rf power, any dc voltage can be set above the minimum of the varying developed dc bias voltage, caused by the reciprocation, or indeed this dc voltage can be set to the maximum, so that the bias voltage does not vary at all with reciprocation. In addition, this dc voltage can be set higher than the maximum developed dc bias voltage from the applied rf power. This feature of having an rf-filtered dc power source connected to the substrate holder in addition to the rf power source provides another dimension of control whereby the magnitude of the substrate bias voltage can be increased over that developed from the applied rf power, without having to appreciably increase input power. In other words, the substrate bias voltage can be varied nearly independently of the bombarding-ion current density. By operating the electrically isolated cantilevered drum planetary substrate holder in the powered mode, after an electrically conductive coating of sufficient thickness has been deposited on the electrically insulating disk substrates in the floating mode, then the substrate bias voltage can be adjusted, for a given plasma density and a given deposition rate, to obtain levelized coatings that are characteristic of the energetic-atom-deposited dense fibrous Zone T structure.

From the above description, it will be apparent that the invention disclosed herein provides a novel and advantageous magnetic-recording disk having a substrate composed of ceramic. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for manufacturing a recording medium for magnetic-recording applications comprising the steps of:

providing a substrate having a surface and being composed of a ceramic material;

coating the surface of the substrate with a first coating of an electrically conductive material having a hardness at least as great as the hardness of the ceramic material, wherein the first coating is characterized by an energetic-atom-deposited dense fibrous Zone T structure;

coating over the first coating with a second coating of a texturable thin layer having a hardness that is less than the hardness of the first coating material;

texturing the second coating; and coating over the -textured second coating with a layer of magnetic-recording material.

2. A method as recited in claim 1 wherein said first coating is a material selected from a group consisting of the nitrides, carbides, and borides of titanium, zirconium, hafnium, vanadium, niobium, tantalum, chromium, molybdenum, and tungsten.

3. A method as recited in claim 1 wherein said step of coating over the textured second coating with a layer of magnetic-recording material is accomplished by substrate bias sputtering.

4. A method for manufacturing a recording medium for magnetic-recording applications comprising the steps of:

providing a substrate having a surface and being composed of a ceramic material;

coating the surface of the substrate with a first coating of an electrically conductive material having a hardness at least as great as the hardness of the ceramic material of the substrate, wherein the first coating is characterized by an energetic-atom-deposited dense fibrous Zone T structure; and coating over the first coating with a layer of magnetic-recording material.

5. A method as recited in claim 4 wherein said first coating is a material selected from a group consisting of the nitrides, carbides, and borides of titanium, zirconium, hafnium, vanadium, niobium, tantalum, chromium, molybdenum, and tungsten.

6. A method as recited in claim 4 wherein said step of coating over the first coating with a layer of magnetic-recording material is accomplished by substrate bias sputtering.

7. A method for manufacturing a magnetic-recording medium comprising:

providing a disk-shaped substrate composed of a ceramic material;

depositing a first coating on the substrate, wherein the first coating is a nitride, carbide, or boride of a metal selected from the group consisting of titanium, zirconium, hafnium, vanadium, niobium, tantalum, chromium, molybdenum, and tungsten, wherein the first coating is characterized by an energetic-atom-deposited dense fibrous Zone T structure, and wherein the thickness of the first coating is between 0.5 and 5.0 micrometers; and depositing a layer of magnetic-recording material overlying the first coating.

8. A method as recited in claim 7 further comprising a step of diffusing an elemental metal from said group to form an interfacial diffusion region at the interface between the first coating and the substrate.

9. A method as recited in claim 7 further comprising a step of applying a second coating after the step of depositing the first coating and before the step of depositing the layer of magnetic-recording material, wherein the second coating is composed of the same constituents in different proportions as the first coating and has a hardness that is less than the hardness of the first coating.

10. A method as recited in claim 7 wherein said first coating is deposited on the substrate by a process of evaporative ion plating.

11. A method as recited in claim 7 wherein the first coating has a surface finish that is smoother than a surface finish of the underlying ceramic material.

12. A method of manufacturing a magnetic-recording medium comprising:

provinding a substrate composed of a ceramic material;

depositing a first coating on the substrate, wherein the first coating is an electrically conductive material having a hardness at least as great as the hardness of the ceramic material, wherein the first coating is characterized by an energetic-atom-deposited dense fibrous Zone T structure, and wherein the thickness of the first coating is between 0.5 and 5.0 micrometers, and wherein the first coating is a nitride, carbide, or boride of a metal selected from the group consisting of titanium, zirconium, hafnium, vanadium, niobium, tantalum, chromium, molybdenum, and tungsten; and depositing a magnetic layer overlying the first coating.

13. A method as recited in claim 12 further comprising a step of diffusing an elemental metal from said group to form an interfacial diffusion region at the interface between the first coating and the substrate.

14. A method as recited in claim 12 further comprising a step of applying a second coating after the step of depositing the first coating and before the step of depositing the layer of magnetic-recording material, wherein the second coating is composed of the same constituents in different proportions as the first coating and has a hardness that is less than the hardness of the first coating.

15. A method as recited in claim 14 wherein the substrate is a disk, and wherein the method further comprises a step of circumferentially texturizing the second coating on an outer surface thereof.

16. A method as recited in claim 12 further comprising a step of depositing a chromium or chromium-alloy layer overlying the first coating before the step of depositing the magnetic layer.

17. A method as recited in claim 16 wherein the magnetic layer is composed of a cobalt-alloy material.

18. A method as recited in claim 12 wherein said first coating is deposited on the substrate by a process of evaporative ion plating.

19. A method as recited in claim 12 wherein the first coating has a surface finish that is smoother than a surface finish of the underlying ceramic material.

* * * * *